United States Patent [19]

Appleby

[11] 4,019,896
[45] Apr. 26, 1977

[54] TRASH DISPOSAL SYSTEM

[76] Inventor: Vernon L. Appleby, 1720 W. Bayshore, No. 19, Palo Alto, Calif. 94303

[22] Filed: July 3, 1975

[21] Appl. No.: 593,150

Related U.S. Application Data

[63] Continuation-in-part of Ser. No. 300,632, Oct. 25, 1972, abandoned.

[52] U.S. Cl. .................... 75/44 S; 48/210; 60/39.2; 110/8 R; 204/98; 204/128; 204/129; 423/421; 423/658
[51] Int. Cl.[2] .................... C21B 15/00
[58] Field of Search .............. 75/44 S, 42; 204/98, 204/128, 129; 423/421, 658; 60/39.02; 48/210; 110/8 R, 10

[56] References Cited

UNITED STATES PATENTS

| | | | |
|---|---|---|---|
| 3,052,612 | 9/1962 | Henegar et al. | 204/98 X |
| 3,403,643 | 10/1968 | Denig | 110/10 |
| 3,459,953 | 8/1969 | Hughes et al. | 204/129 |
| 3,759,036 | 9/1973 | White | 48/209 |
| 3,917,239 | 11/1975 | Rhinehart | 75/44 S |
| 3,926,582 | 12/1975 | Powell, Jr. et al. | 48/209 |

Primary Examiner—M. J. Andrews
Attorney, Agent, or Firm—John L. McGannon

[57] ABSTRACT

Apparatus and a method of disposing of trash comprised of a wide variety of constituents including garbage, metals, glass, plastic and other scrap materials, wherein the trash is directed into an incinerator and subjected to high temperatures to reduce the trash in a manner to permit part of the effluent from the incinerator to be processed for recovery of chemicals therein and to permit all residues to be collected, separated out and further processed as desired. In processing the effluent to retrieve the chemicals therein, chemicals from seawater, brine wells or salt is utilized to combine with the effluent to effect the isolation of a plurality of chemicals derivable from the trash. The chemicals can be stored for subsequent use. Electrical energy, hydrogen and steam can be generated by the burning of the trash in the incinerator.

11 Claims, 12 Drawing Figures

A. REGULATOR VALVE SET FOR MAX. STORAGE PRESSURE

B. EVAPORATOR COIL WOUND AROUND STORAGE TANK

C. REGULATOR VALVE TO ESTABLISH EVAPORATOR OPERATING PRESSURE

TRASH DISPOSAL SYSTEM

This is a continuation-in-part of U.S. Application Ser. No. 300,632, filed Oct. 25, 1972 now abandoned.

This invention relates to improvements in the disposal of trash and, more particularly, to a system of trash disposal which is non-polluting and allows for recovery of basic metals and chemical elements which are constituents of the trash to be disposed.

BACKGROUND OF THE INVENTION

There have been a number of attempts in recent years to provide trash incineration processes which do not cause pollution of the atmosphere and which allow for recovery of certain constituents inherent in the make-up of the trash itself. In the burning of trash, steps have previously been taken to assure that the effluent from the incineration region is thoroughly sprayed or driven through electrostatic preciprotators to prevent solid particles to pass out of the stack and into the atmosphere so as to avoid polluting the same. Also, such prior attempts have succeeded to some extent in separating out a number of different chemical elements, such as certain metals so that the metals can be collected in bulk and returned to a foundry or mill for recycling purposes. While such prior attempts have resulted in a partial recovery of the constituents completely contained in the trash, they have not resulted in substantially completely retrieving from the trash all or substantially all of the constituents thereof including metals and chemical elements, in a manner to assure a non-polluting effluent directed into the atmosphere after separation of such constituents from the effluent. As a result, the prior incineration techniques are inefficient and give rise to some pollution of the atmosphere notwithstanding the attempts to minimize such pollution and to retrieve certain constituents derived from the make-up of the trash itself.

Currently, many Governmental agencies and Municipalities are enacting legislation directed to the elimination of atmospheric pollution and the prevention of depositing trash in uninhabited land areas, such as swamps, bay marshes and the like. Moreover, such legislation requires or attempts to require deadlines on the part of cities to find adequate means of disposing of the trash collected daily from residential and commercial properties. All of the foregoing activities have made it mandatory that some means of disposing of trash quickly and easily in a non-polluting manner be found and established in operation as soon as possible.

SUMMARY OF THE INVENTION

The present invention is directed to a system of disposing of trash in a completely efficient manner so as to permit retrieving of constituents of the trash for recycling purposes, yet the trash is disposed of by incineration without polluting the atmosphere. To this end, the invention relates to apparatus and a method for incinerating trash wherein the products of combustion or the effluent, instead of being allowed to enter and pollute the atmosphere, are processed in a manner to permit separation out of a number of different chemical elements for which a market exists. Thus, the separated chemical elements can be collected, stored and reused, such as by being sold to businesses in need of such chemical elements. Moreover, the apparatus and method of the present invention permits the uses of chemicals from ordinary seawater which is readily available to combine with the products of combustion to facilitate the separation of the elements from each other and to simplify the processes by which such elements are placed in condition for marketable use.

The incinerator used as part of the apparatus of the present invention is constructed to cause generation of steam or molten metals which can be used for driving electrical generators so that electrical power can be generated to operate the various machines and other equipment needed to process and separate out the chemical elements from the products of combustion. Thus, the present invention is a self-contained system which relies only upon the trash itself and the use of sea-water to sustain the systematic operation, once the operation has been commenced. Such operation not only completely eliminates the trash but also provides a profit-making business inasmuch as the constituents retrieved from the incineration of the trash can be made commercially available, thereby filling market needs as they arise and continue. Moreover, the present invention can be made applicable to trash disposal situations wherein large volumes of trash are to be handled. As a result, the invention is especially suited for the elimination of trash problems of cities inasmuch as the daily trash pick-up from a city can be directed to the point of incineration continually to thereby provide a continuously sanitary atmosphere for the city. Moreover, such an incineration region can be relatively close to a city inasmuch as air pollution will be substantially minimized or eliminated by virtue of the substantially complete removal of all pollutants from the effluent that issues from the incineration region into the atmosphere.

The primary object of this invention is to provide a trash disposal system which is non-polluting yet allows for a substantially complete retrieval of some of the constituents of trash during and after incineration thereof.

Another object of this invention is to provide a trash disposal system of the type described wherein the elements in ordinary seawater are combined with the products of combustion of the incineration operation to facilitate the separation of constituents from the effluent and to provide for the formation of isolated chemical elements which can be stored for subsequent commercial use.

A further object of this invention is to provide a trash disposal system of the aforesaid character wherein the heat of combustion of the trash permits the generation of steam and electrical energy, yet molten residues, such as metals and the like, can be collected, separated out and further processed or stored while, at the same time, elements in ordinary seawater can be combined with the constituents in the effluent to cause formation of isolated, storable chemical elements which can be marketed individually.

Other objects of this invention will become apparent as the following specification progresses, reference being had to the accompanying drawings for an illustration of the invention.

Figure 1:
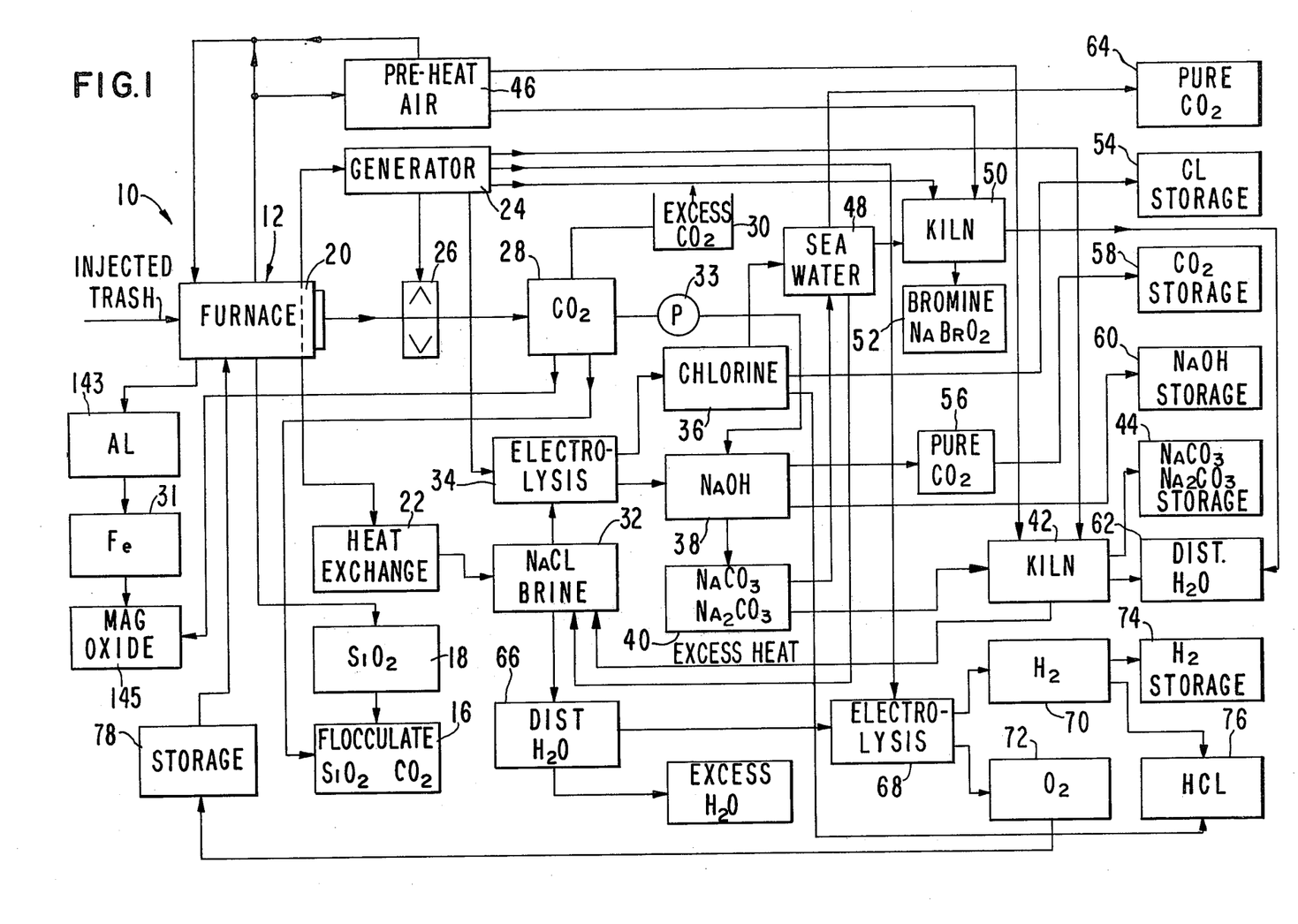
FIG. 1 is a block diagram of the trash disposal system and constituent-retrieval sequence of the present invention.

The trash disposal system of the present invention is denoted by the numeral 10 and is illustrated in block form in FIG. 1. System 10 operates in a manner to avoid thermal, environmental and atmospheric pollution and is a self-sustaining system inasmuch as it requires only the trash itself and ordinary seawater or brine to maintain operation after it has been brought to operating temperatures. As a result of the operation of system 10, a number of chemical elements, including gases, liquids and solids, can be separated out and collected for subsequent commercialization. Among these elements are chlorine, hydrogen, oxygen, hydrogen chloride, carbonates, bromides, pure carbon dioxide, magnetic oxide, distilled water, silaceous building material, ferrous materials, aluminum, sulfuric acid, tin, nitric acid and ammonia. Thus, system 10, when in operation, not only serves to dispose of the trash directed thereinto but also provides a business operation which is profitable and which permits substantial economies to be practiced especially on the part of large cities and the like whose daily trash and garbage volume is relatively large.

System 10 (FIG. 1) utilizes a furnace 12 for receiving trash which is injected thereinto after the trash has been directed through a separator, such as a cyclone separator or a magnetic separator, to eliminate large chunks of materials such as certain metals, concrete objects, stone, other inert materials and the like. Thus, the injected trash into the furnace will be of relatively small particle size such as ¼-inch to ⅛-inch in cross section or length. Considering the glass, bottles and the like are not separated prior to being injected into the furnace, the furnace is constructed to make the entire trash disposal process of this invention more economical. The pulverized material is blown into the furnace and is self-ignited by radiant energy of the furnace walls and pre-heated air 900° F. to 1000° F. The furnace must be fired-up to an operating temperature of approximately 2600° F. to 3000° F. with natural gas or some suitable fuel. The pulverized trash is fed in slowly until operating temperatures are reaches, (2600° F. to 3000° F. or above) then the external source of energy may be dispensed with.

The trash used in the present invention can be either domestic, industrial trash or both. For one definition of municipal trash, domestic or industrial, reference is had to Report No. 4284, dated November 1968, of the Naval Ordnance Laboratory. This report is entitled "New Utility Concepts for New Cities." Another definition of trash has been given by the Environmental Protection Agency and is considered representative of the trash which the present invention can use and is as follows:

| | |
|---|---|
| Paper | 31% |
| Yard Wastes | 19% |
| Food | 18% |
| Glass | 10% |
| Metals | 10% |
| Wood | 4% |
| Plastic | 3% |
| Rubber & Leather | 3% |
| Textiles | 1% |
| Other | 1% |

At operating capacity, furnace 12 can typically handle 40 tons of trash per hour. At this rate, the oxygen requirement for the furnace can be calculated as follows:

The amount of Oxygen in 1 cubic foot of air is by weight 0.00316 lb. at 30° C and at standard pressure.

At forty tons per hour $$\frac{80,000}{320,000} \text{ lbs.} = 3.15 \times 10^3 \frac{3.15 \times 10^5}{\text{(approximation) } 3.15 \times 10^3} = 1 \times 10^8 \text{ or } 100,000,000 \text{ cu.ft./hr.}$$

approximately, and is a minimum based on standard pressures at a temperature of 30° C. A ratio of 1 to 4 (1 lb. of combustible to 4 lbs. of oxygen) is considered to be the most efficient condition for complete oxidation. However, the amount of available $O_2$/cu.ft./temp. changes as the temperature rises (as per preheated air). Oxygen lances used for periodic clinker removal are outside the figures above but can be calculated into the overall energy requirements as a by-product of electrolysis for the production of hydrogen in the system, or from the liquifaction of air which would be better since purity does not have to be high, the nitrogen from this process being used for the protection of ammonia.

The energy requirements for the liquefaction of oxygen can be calculated as follows:

1. 35hp./hr. = 1,000 cu.ft. × .00316 = 3.16 lbs. $O_2$ 2. 9 kw./hp. × 35 = $\begin{cases} 31.5 \text{ kw.-hr.} \\ 3.16 \text{ lbs. } O_2/\text{hr.} \end{cases}$ By these calculations it would require 700 kw. to produce 632 lbs. of oxygen. Nitrogen is, of course, a by-product of this operation and is separated by fractionation and used in the synthesis of ammonia.

1. $\frac{O_2 - 90° K}{N_2 - 77.5° K}$ = a common Bp. of 81° K, fractionation difference of 23° K For the production of synthetic nitric acid, the following applies:

| 1. | Anhydrous Ammonia | 590 lbs. | per ton 100% $HNO_3$ |
|---|---|---|---|
|  | Platinum | variable* |  |
|  | Power | 470 kw.-hr. |  |
|  | Direct labor | 2.7 man-hr. |  |

2. $4 NH_3 + 5 O_2 \rightarrow 4 NO + 6 H_2O + 214,200$ Cal., $2 NO + O_2 \rightarrow 2 NO_2$.

$3 NO_2 + H_2O \rightarrow 2 HNO_3 + NO$

*Platinum loss is about 0.012 oz/ton.

\* Platinum loss is about 0.012 Oz/ton.

Ammonia mixed with ten times its volume of air is passed through a gauze of platinum wire at about 800°, which catalyzes the reaction with 95% conversion. Contact is less than 0.01 second, perhaps 0.001, is sufficient. The reaction is exothermic and the correct temperature is maintained by regulating the flow of the gases. All large scale operations are of this method (Ammonia Oxidation).

Ammonia Oxidation Process $NH_3(g) + 1\frac{1}{4} O_2(g) \rightarrow NO(g) + 1\frac{1}{2} H_2O(g) + 54.1$ kg. Cal.    1.

$NO + \frac{1}{2}O_2 \rightarrow NO_2(g) + 13.6$ kg. Cal.    2.

$3NO_2(g) + H_2O(l) \rightarrow 2HNO_3$ (50% sol.) $+ NO(g) + 29.4$ Kg. Cal.    3.

This is at 700° C and gives NO (exothermic) using a platinum or platinum-rhodium cat.

Electrolytical $H_2$ and mechanical power plus $N_2$/short ton involves 14,000 – 15,000 kw.-hr. for production other than with this system.

Efficiency and Loss Data on 90% Pt. 10% Rh alloy

Temp. of Cat; 835° C – 900° C
Conversion of Efficiency; 97% – 99%
Cat. Loss troy oz./100,000 lb. - $NH_3$ burned; 0.2 – 0.55

It would be more economical to use the Bamag type converter or base metal catalyst ($FeO_2$) with barrium oxide. However, it would be to the advantage of the economy of the system to look into the Peterson, R. F., U.S. Pat. No. 2,201,631 issued in 1940 for the $HNO_3$ concentrator using $H_2SO_4$ from the system itself.

Distilled water acquired from the brine concentrating tanks will be used for the iron steam process (no impurities to poison Fe reaction).

$3Fe + 4H_2O \rightarrow Fe_3O_4 + 4H_2 + 38,000$ Cal.

Concentration of nitric oxide us 1% – 2% within effluent after passing through the arc chamber that is used to dissociate chemical and particulant matter. This should present no problem because most of the effluent is further scrubbed for the formation of carbonates. $NO_x$ becomes an impurity of the soda ash formed.

One ton of refuse when burned yields approximately 10.5 million Btu's. At forty tons per hour consumption the amount of BTu's would be 420,000,000 which would be approximately equivalent to 40,000 kw.-hr. 40,000 kw.-hr. minus 10,300 kw.± to operate the dissociation chambers (hereinafter described) would give an energy availability estimated at around 20,000 kw.-hr. to 25,000 kw.-hr. It should be understood that 90% of the energy expended in the dissociation chambers is later reclaimed in the systems heat exchange, which would mean that the only energy lost would be that of the ionization potential for various gases (which is mostly $CO_2$).

The above energy requirements can be found as follows:

| Solid Waste Combustion Stack Gas Heating | | | |
|---|---|---|---|
| 1. T = 2,000° F. | | | |
| 2. Composition of Waste | | | |
| Component | % by Wt. | Molecular Weight | % Assumed for Analysis |
| $H_2O$ | 19.7–31.3 | 18 | 20 |
| C | 23.5–33.5 | 12 | 30 |
| N | <1% | 14 | 0.3 |

-continued

Solid Waste Combustion Stack Gas Heating

| | | | |
|---|---|---|---|
| Cl | <1% | 35 | 0.3 |
| S | <1% | 32 | 0.3 |
| Ash | 9.5–26.8 | | |
| Oxygen | 15.37–31.9 | 16 | 10 |

| Component | Stack Gas Component | Waste Gas g/solid W. g | Specif. Ht. |
|---|---|---|---|
| $H_2O$ | $H_2O$ | 0.2 | 0.8 Cal/g/° C |
| C | $CO_2$ | 1.1 | 0.1 |
| N | $NO_2$ | 0.01 | 0.33 |
| Cl | HCl | 0.01 | |
| S | $SO_2$ | 0.006 | 0.30 |
| Ash | | | |
| Oxygen | $O_2$ | 0.2 | |
| | | Total 1.53 | |

$H_2O = 0.16$ cal/° C
$CO_2 = 0.11$
$NO_2 = 0.0033$

For $\frac{2,000° F.}{1.80° F./C°} = \begin{cases} 0.275 \times 1.1 \times 10^3 \\ 305° \text{ cal/gram} \end{cases}$ $SO_2 = \frac{0.0018}{.2751 \text{ cal/g/C°}}$ At 40 Tons/hr. minus 20% non-combustible gives 80% burned.

$\frac{40 \times 2,000 \times 0.8}{3,600} \times \frac{1 \text{ KG}}{2.2 \text{ lbs.}} \times 1,000 \text{ g/KG} = 8.08 \times 10^3 \text{/g/sec.}$ At 305 cal/g = $8.08 \times 10^3 \times 305 \times 10^3 = 2.46 \times 10^6$ cal/sec =

$\begin{cases} 10.3 \times 10^6 \text{ J/sec} \\ 10,300 \text{kw} \pm 50\% \end{cases}$ The electric arc treatment is simple arc heat combustion or dissociation in an oxygen-rich atmosphere in the arc chamber whose temperature is about 2000° F. or above. The composition of the effluent includes water vapor, carbon dioxide, oxides of nitrogen, hydrogen chloride and sulphur dioxide. At a temperature of 2000° F. or above, vaporiziation of particle material of the effluent occurs.

Furnace 12 is provided with heat exchangers in the form of tubular coils surrounding the furnace and embedded in the wall thereof to absorb the heat of combustion from within the furnace. The innards of the furnace has its own preheating air system 91 (FIG. 7) in that pre-heated air is directed back into the furnace mouth along with the pulverized trash. This system is independent of the main heat exchangers that utilizes air, metal and steam as a transfer medium. The furnace's independent pre-heater 91 also serves as a temperature regulator for the furnace. The heat exchangers are denoted by the dashed line 20 in FIG. 1 and are located in a chamber 109 (FIG. 7) above the incineration region of the furnace, whereas pre-heater 91 is in the walls of the furnace near the incineration region.

Fluids for the heat exchangers may include molten metals, bi-phenyl alloys of bismuth, water, steam and air. Such a fluid will be directed to a unit for producing steam and the steam will be directed to electrical generators 24 for the generation of electrical power for use in driving certain pieces of equipment used to carry out the method of the present invention. Moreover, generators 24 are coupled to an arc chamber 26 forming a part of furnace 12 and disposed in the path of the effluent therefrom. The purpose of the arc chamber is to provide simple arc heat combustion to cause vaporization of all solid carbonaceous particles which pass out of the furnace in the effluent, the latter being the flow of combustion gases formed by the burning of trash. As a result, substantially all of the effluent downstream of the arc chamber contains no particulate matter denoted by block 28 of FIG. 1. A portion of this carbon dioxide can be driven off to the atmosphere by means of a stack 30 since carbon dioxide is non-polluting. Another part of the carbon dioxide is directed to flocculation chamber 16 selectively; still another portion of carbon dioxide is directed into a container 31 containing iron or pot metal in a manner hereinafter described. A metallic heat exchanger 27 (FIG. 7) forming a part of heat exchangers 20 is placed nearest the highest temperature point immediately downstream of the arc chamber to keep the temperature down to reaction level for the scrubbers of $SO_2$ and $NO_x$.

Heat exchanger 22 is also used to preheat brine or seawater in a tank 32 coupled to a suitable source of seawater after filtration. To bring it to correct saturation, the seawater is then electrolyzed in a tank 34 coupled to electrical generators 24 and the electrolyzed seawater results in the formation of chlorine, directed into tank 36, and sodium hydroxide directed into a tank 38. A portion of the carbon dioxide from the effluent of the furnace is pumped by a pump 33 into tank 38 with the result being that sodium hydroxide in tank 38 can be used as a high powered scrubber, resulting in the formation of sodium carbonate and sodium bicarbonate in a tank 40 coupled with the outlet of tank 38. The carbonates are directed into a kiln 42 at 180° F. for drying and the resultant soda ash then to a tank 44 for storage and subsequent use. Kiln 42 is coupled to electrical generator 24 for receiving electrical power therefrom. It is understood that the electrical power may be shut off or directed to another part of the system to produce the most important materials called for and to conserve the system's own power. Also, kiln 42 receives pre-heated air from a source chamber 46 coupled with a heat exchanger of furnace 12. Thus, kiln 42 is operated more efficiently in drying the carbonates. An auxiliary kiln may be used for such things as pre-drying incoming material before it gets to the furnace mouth or for drying wet sewage sludge from water treatment plants.

The analyses of saline material of seawater calculated in ions is as follows:

| Ions | Percent of Total Salts | Gr/L. of Ocean Water |
|---|---|---|
| Cl | 55.292% | 19.68 |
| Br | 0.188% | 0.07 |
| $SO_4$ | 7.692% | 2.74 |
| $CO_3$ | 0.207% | 0.08 |
| Na | 30.593% | 10.89 |
| K | 1.106% | 0.40 |
| Mg | 3.725% | 1.33 |
| Ca | 1.197% | 0.43 |
| | 100.000% | 35.62 |

The salt suitable for electrolysis to produce chlorine and sodium hydroxide should be as follows:

| | |
|---|---|
| NaCl | 98.5 |
| Insoluble Matter | 0.57 |
| Moisture | 0.07 |
| CaO | 0.28 |
| MgO | trace |
| $SO_3$ | 0.12 |
| $Fe_2O_3$ | trace |

The analysis of treated and acidified brine is as follows:

| | | |
|---|---|---|
| Sp.gr. at 20° C | 1.196 | |
| NaCl | 315 | g/L |
| HCl | 0.16 | g/L |
| Na$_2$SO$_4$ | 2.0 | g/L |
| CaO | 0.67 | g/L |
| MgO | Nil | |

Preparation of Brine

The brine to be used may come directly from wells. In this case it must be purified before it is sent to the cells.

If the starting material is solid rock salt, the brine is prepared in a saturator. The saturator tank is kept full of salt and water is introduced at the bottom of the tank, and the flow is so regulated that as it flows it becomes saturated with salt and is taken out at an outlet at the top. Salt is constantly added to keep the tank full, and the mud that accumulates in the saturator is flushed out at intervals from the outlet at the bottom. The brine flowing out at the top should contain about 315 gm. NaCl/L at a specific gravity of 1.20 at 25° C. Distillate from the unit will be used because of the lack of impurities as not to foul the cells, hence added lifetime of the diaphragms.

Salt suitable for this purpose must be free from calcium, magnesium and iron, the brine is purified with chemicals produced from within the system itself, as the system is self-sustaining. The method of purification is essentially the same for both sea water and brine preparations.

To correct the alkalinity in the treated brine, hydrochloric acid which is also produced from within the system, is added in slight excess (about 3½ lbs. HCl to every 1,000 gals. of brine) and the solution is agitated with steam from below which will bring the temperature up to 25° C. The acid reaction is also necessary to prevent any hypochlorite formation in the anode compartment during electrolysis.

The theoretical voltage required can be roughly calculated from the following thermo-chemical equation, although the result is not accurate thermodynamically.

$$2NaCl + 2H_2O \rightarrow 2NaOH + H_2 + Cl_2 + Q$$

Heat of formation of 2NaCl in aqueous solution 2 × 96,600 cal. Heat of formation of 2NaOH in aqueous solution 2 × 112,450 cal. Heat of formation of 2H$_2$O in liquid state 2 × 69,000 cal.

$$Q = 2 \times 53,150 \text{ cal.}$$

$$V = \frac{2 \times 53,150 \times 4.187}{2 \times 96,540} = 2.3 \text{ volts}$$

This is the theoretical minimum voltage. Some energy is dissipated as heat through the resistance of the electrolyte.

All mercury cells are prohibited because of contamination.

| SOME TYPICAL OPERATING RESULTS OF THE HOOKER S CELL | |
|---|---|
| Terminal V. | 3.28–3.45 |
| Current/cell | 5,000–7,000 amperes |
| Current density, anode | 55 amp/sq.ft. |
| Current density, cathode | 47 amp/sq.ft. |

| -continued SOME TYPICAL OPERATING RESULTS OF THE HOOKER S CELL | |
|---|---|
| Current efficiency | 94–95% |
| Energy efficiency | 64–66% |
| NaOH/kw.-hr. | 0.91–0.94 lb. |
| NaOH/cell/day | 455 lbs. |
| Cl$_2$/kw.-hr. | 0.84 lb. |
| Cl$_2$/cell/day | 413 lbs. |
| Life of Anode | 350–600 days |
| Life of diaphragm | 175–250 days |

As a typical example, considering that the cell produces both Cl$_2$ and NaOH:

$$40 \text{ cells/day} = \frac{8 \text{ tons } 521 \text{ lbs. Cl}_2}{2,890T \; 947 \; 900 \text{ lbs.}} \xrightarrow{1 \text{ yr.}} = 2984 \text{ tons } 900 \text{ lbs/yr.}$$

$$40 \text{ cells/day} = \frac{9 \text{ tons } 200 \text{ lbs. NaOH}}{3,341T \; 1,000 \text{ lbs/yr.}} \xrightarrow{1 \text{ yr.}}$$

2984 tons 900 lbs. of Cl$_2$ 6325 tons 1900 lbs. NaCl times 3

18,975 tons of dist. H$_2$O/yr.

37,950,000 lbs.

The comparison of rock salt and seawater crystals is as follows:

| Rock Salt | | Sea Salt Crystals | |
|---|---|---|---|
| Moisture | 0.34% | Moisture | 7.66% |
| Insoluble matter | 0.01% | Insoluble matter | 0.50% |
| CaSO$_4$ | 1.69% | CaSO$_4$ | 1.33% |
| MgCl$_2$ | 0.16% | MgCl | 0.78% |
| NaCl | 97.62% | MgSO$_4$ | 0.06% |
| CaCl$_2$ | 0.18% | NaCl | 89.67% |

There are two methods to be considered for the removal of solid salt from the brine of sea salt. The Alberger Process should also be considered. In the vacuum process, the harder the plant is run the larger the crystals, whereas the Grainer Process, the slower the rate of production the larger, denser and heavier the grain. In present day operations it is possible to maintain a purity of 99.7% if the pans are washed out every 36 hours or 99.5% if the pans are washed out once a week.

The Alberger Process operates at about 143° C and under about 35 lbs. gage pressure. The purity of the salt is about 99.95% pure and effeciency of calcium sulfate removal is greater than 98.00%. The Alberger system could be justified on the basis of economy for the use in the present invention for need of purity and abundant source of energy that is available. Thus, the present invention could operate very effeciently using ground deposites of salt and inland areas away from the sea.

Sulfuric acid, chlorine and seawater and the carbonates are admixed in a tank 48 to displace bromine, the bromine is the reacted with sodium hydroxide forming sodium bromate and is directed into a kiln 50 for drying. Bromates are then stored in tank 52 coupled with kiln 50.

Figure 9:
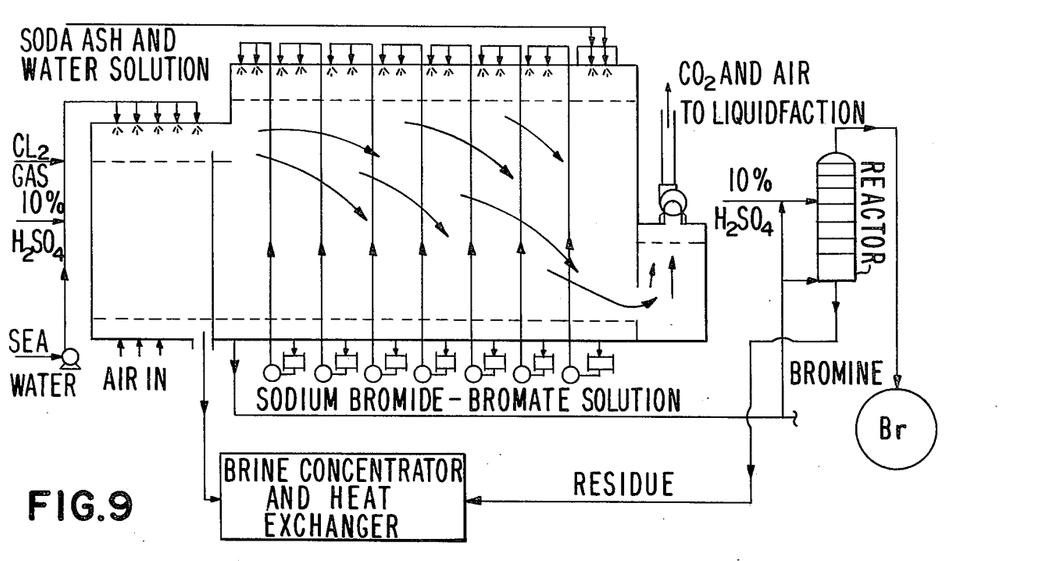
FIG. 9 is a schematic view of a bromine extraction unit which can be used with the present invention to recover bromine.

For a typical bromine extraction unit, reference is had to FIG. 9 which shows such a unit. Bromine, the second of the halogens in abundance and importance is a liquid which boils at 63° C. In the form of bromides, it occurs to the extent of about 0.064 grams per liter, or approximately ½ lb./1000 gal. in sea water. Bitterns from sea water evaporation as they occur in, for instance, the San Francisco Bay District will contain 1.5 to 2.0 gr./liter of bromine. There are many natural brines containing from 0.1 to 1 gram per liter bromine. If the concentration is about 0.3 gr/L or over it is practical to recover the bomine, in one step by the direct chlorination of the brine. At 0.3 gr/L it takes 1.3 lb of chlorine for displacement of Bromine.

$$3Na_2CO_3 + 3Br_2 = 5NaBr - NaBrO_3 + 3CO_2 \text{ (water vapor understood)}$$

$$MgBr_2 + Cl_2 = MgCl_2 + Br_2$$

10% $H_2SO_4$ is added to lower the pH level to 3.5 to repress the hydrolysis of the chlorine. The magnesium chloride formed is later crystalized out in the Grainer Pans for use in obtaining Magnesium.

The chlorine in tank 36 formed upon electrolysis of seawater is directed into a tank 54 for storage. Also, when carbon dioxide is pumped into tank 38 and scrubs the sodium hydroxide in solution therein, the result is pure carbon dioxide denoted by block 56 and this pure carbon dioxide is directed into a storage tank 58 for subsequent use. Also, the sodium hydroxide can be directed from tank 38 into tank 60 for storage and subsequent use.

When kilns 42 and 50 operate to dry the mixtures directed thereinto, they generate steam which, when condensed, provides distilled water. Such distilled water is collected and stored in a tank 62 for subsequent use. Another source of pure carbon dioxide results when sulfuric acid, chlorine and seawater is combined with the carbonates from tank 40. This pure carbon dioxide is directed into a storage tank 64 for subsequent use.

When seawater is pre-heated in tank 32 by the heat from heat exchanger 22, some steam is developed and, when this steam condenses, it forms distilled water denoted by block 66. This distilled water is electrolyzed in tank 68 by adding sulfuric acid and using electrical power from generators 24, the result being pure hydrogen collected in tank 70 and pure oxygen collected in tank 72. Standard electrolytic cells separate oxygen from hydrogen automatically when the two are formed. The hydrogen can be directed into a storage tank 74 or can be combined with chlorine to form hydrochloric acid directed into a storage tank 76. The oxygen in tank 62 can be used for various purposes, one of which is to be directed into a storage tank 78 for periodic use as an oxidizer in furnace 12. Also, the oxygen is directed into flocculation chamber 16 to increase the temperature therein by reaction with Al and Fe then flocculated with the gases of the effluent under pressure.

The power of energy requirements for the electrolysis of water is determined from the following:

1 kw. hr. = 9.408 cu.ft. of $H_2$ and 4.704 cu.ft. of $O_2$ (This is theoretical, in actuality it is 3½ cu.ft. of $O_2$ and 7 cu.ft. of $H_2$).

The purity of electrolytic Hydrogen is 99.6% – 99.8%
The purity of Hydrogen from the iron steam process is 99.5% – 99.7%.

Liquifaction requirements for Hydrogen are about the same power requirements for Oxygen and Nitrogen.

$CO_2 = -78°$ C BP.
$N_2 = -193°$ C BP.     Separation by fractionation gives Hydrogen a purity of 97% – 97.5%.
$H_2 = -252°$ C BP.

The impurities removed are:
$CO_2 = 1.7\% - 2.0\%$
$N_2 = 1.8\%$

As an example:

700 kw.-hr. = 2,450 cu.ft. of $O_2$ gaseous state / 4,900 cu.ft. of $H_2$ gaseous state Thus, from the foregoing it is seen that, as well as direct formation of hydrogen from the furnace itself by oxygen-hydrogen exchange with iron, the system produces hydrogen of purity by electrolysis. Hydrogen is produced in the cells that produce sodium hydroxide and chloride.

One of the most extensive uses of hydrogen has been in the food industry, for use in hydrogenation of various vegetable oils. One of the problems in the hydrogenation field is that of a cheap supply of pure hydrogen. It should also be taken into consideration that, in view of our dwindling oil resources within the continental boundaries, that not far in the future double and triple the amount will be required for the production of gasololine from oil-bearing shale or to enhance the yield from soft coal. It is very feasible that our major source of power could be derived from hydrogen produced from many installations of the present system very economically, (Power generating plants, trains, buses, ships, even the auto, etc.). Hydrogen is absolutely non-polluting and recycles itself back to the sea from where it comes. Hydrogen-power would be one of the only alternative sources of power in leaque with nuclear energy. Nuclear-power plants produce as a by-product one of the most deadly pollutants known to man, that for all practical purposes does not recycle. The typical nuclear reactor plant costs probably five times as much as three or four good size plants using the present invention.

Figure 12:
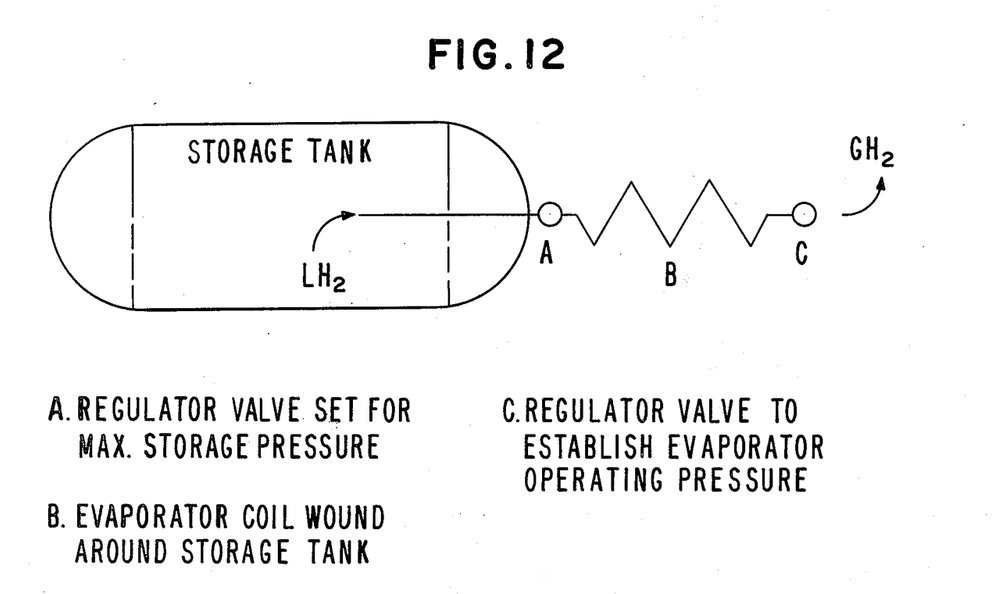
FIG. 12 is a schematic diagram of a hydrogen storage tank.

Considering hydrogen is the first element on the periodic chart, one ton of hydrogen in gaseous form occupies an area of 384,000 cubic feet at atmospheric pressure and at the corresponding temperatures. Compressed to a pressure of 2,000 lbs./square inch, 2820 scf are required. Consequently, storage of just one day's production from a populace of 100,000 would require prohibitively large storage areas. In compressed liquid form the same weight would occupy only 458 cubic feet, four days production of about 100 tons would occupy an area of about 30 × 60 in cylindrical form, this volume could be divided into smaller vessels if necessary. Excess hydrogen could be stored in mobile trailers or in railroad tank cars put on the appropriate side tracks as an auxiliary storage area. In the case of extreme overproduction, the excess could be burned off safely or used to produce hydrogen chloride of very high purity. FIG. 12 relates to a method of hydrogen storage. The excess boil-off of hydrogen is used to produce hydrogen chloride. This figure is taken from NASA Technical Note D-559 of August 1961.

Figure 3:
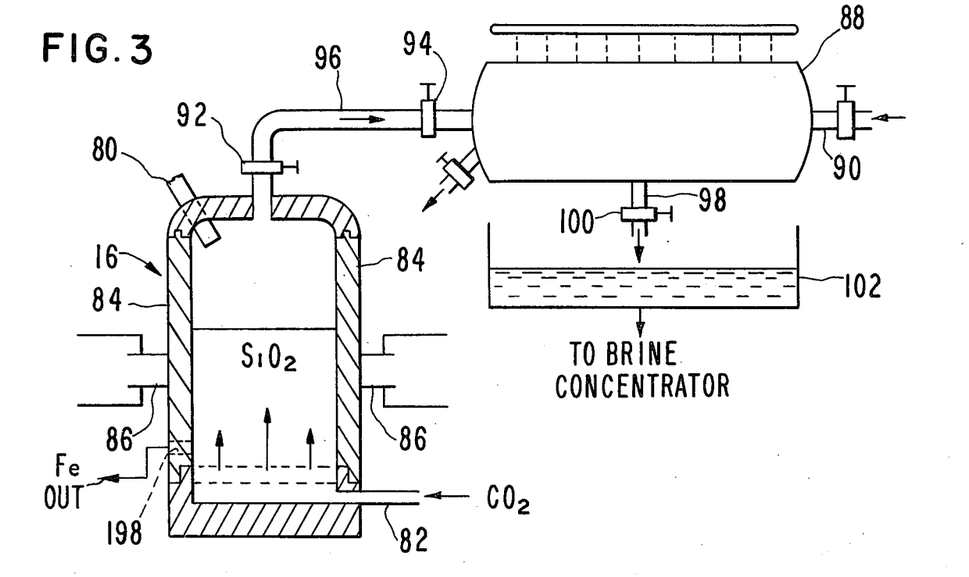
FIG. 3 is a schematic view of a flocculating chamber and the means for creating a partial vacuum.
Figure 6:
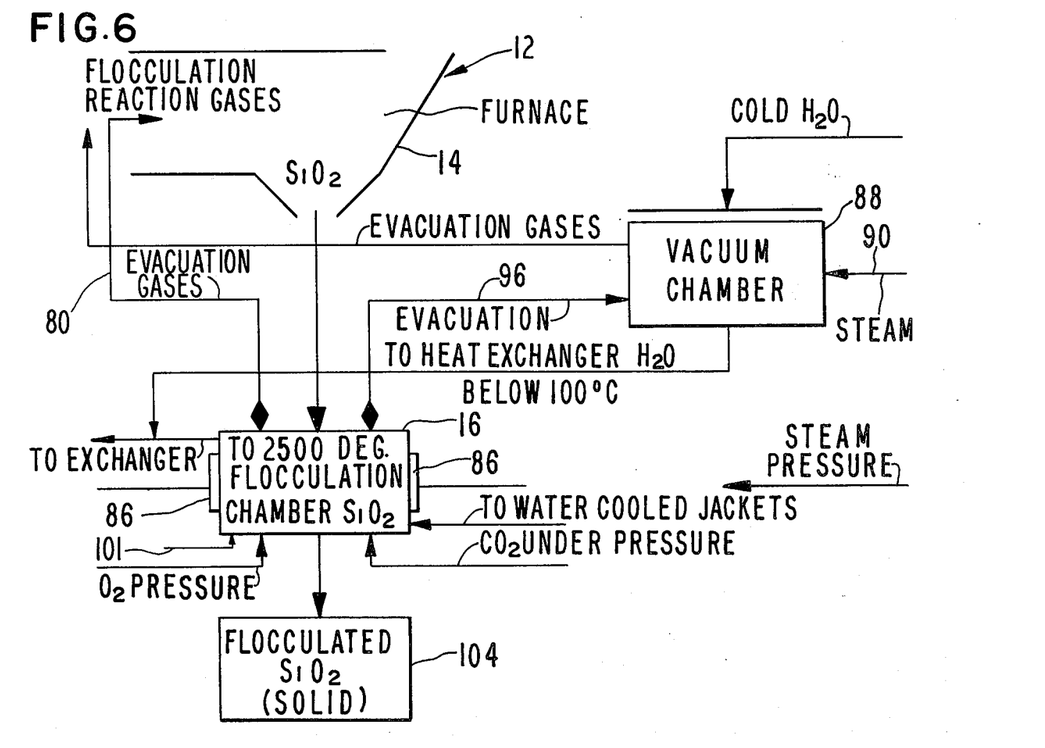
FIG. 6 is a block diagram of the flocculation process utilizing the apparatus of FIG. 3.

Flocculation chamber 16 is shown in more detail in FIGS. 3 and 6. In FIGS. 3 and 6, chamber 16 has an outlet tube 80 for venting gases during beginning stages of flocculation and is directed back to the furnace mouth shown in FIG. 6. The material is raised to a very high temperature by pumping pure oxygen into chamber 16 from tank 78. The added heat makes the silicon dioxide, the flocculent, highly mobile in the chamber. After white heat has been attained in the flocculation chamber, the oxygen flow is stopped and carbon dioxide is pumped under pressure into chamber 16 at the bottom thereof through inlet tube 82, the pressure causing dispension of the carbon dioxide in the silicon dioxide. The carbon dioxide is the flocculator because it is much less dense than the silaceous material, causing bubbles or a froth to be formed. When silicon dioxide has become frothy in chamber 16, the top of the chamber is immediately sealed and a partial vacuum is produced near the top of chamber 16 to expand the bubbles of carbon dioxide which flocculates the liquid silicon dioxide at a temperature of about 3600° F, this temperature attained by a thermite process formed by the admittance of pure oxygen at the base of the flocculation chamber. The thermite reaction takes place because of the combining of oxygen with iron and aluminum. After cooling for a predetermined period of time, the sides 84 of chamber 16 are separated and moved apart from each other by hydraulic piston and cylinder assemblies 86 so that excess to the solid block of silicon dioxide can be had, such block having the color and texture of natural pumice. The block of flocculated silicon dioxide is then taken from chamber 16 and cut into sheets. Being very light in weight, the sheets will provide excellent building materials, insulation, decorative panels, solid fill and the like.

It is standard for any silaceous building material, (slag, mill tailings, etc.) not to exceed 10% lime content above that of the silicate. This fact seems to have been the biggest objection from the engineering point of view, for using such material as a cheap source of building material or as a replacement for portland cement. When we consider that the overall content of the materials fed into the system, the calcium content should be very low. Due to the manner in which the silaceous matter is brought to workable temperature, (this means bringing the material to a mobile condition suitable for flocculation with carbon dioxide from the flue gases), it would have an added amount of aluminum oxide in it. This should in effect be beneficial to its bending strength and compression strength.

The primary purpose of the flocculation chamber is to form a pumice-like material from the glass that is blown into the furnace ignition area. The glassy material also coats the hotest areas of the furnace walls to prevent high temperature oxidation thus giving added lifetime to the furnace and cutting down on expensive repair time. A much more useful by-product is formed inasmuch as the pumice-like material can be cut into sheets that could correspond to a fireproof-acid resistant form of sheet rock now used in the building industry.

This artificial form of pumice also plays an important part in the workings of the furnace itself. It is broken into near spherical size from 5 to 8 inches in diameter then submerged in a slurry of iron oxide which is produced in the oxygen hydrogen exchange of the furnace. The pumice after being submerged in the slurry is then decompressed to insure good colliodal suspension, dried and then used as a scrubber for sulfur dioxide and in the same manner iron sulfide as a scrubber for oxides of nitrogen. The scrubber compound when held in colliodal suspension in this manner is one of the best scrubber agents known. Other scrubbers which are produced on site could be used very efficiently but due to the temperatures involved, iron oxide and iron sulfide as a scrubber seems to be economically best suited for this purpose.

Heater exchanger 27 will be used to reduce the temperature of the effluent passing therethrough from about 3300° F. or above to about 500° F. to 550° F. for the displacement of sulphur with $NO_x$. The heat energy absorbed by heat exchanger 27 will be used to produce electricity or to supply the system with energy at other operating points, such as brine concentration or preheating of air. More than one heat exchanger will generally be used for this purpose. Beyond outlets 121 (FIG. 7), the effluent is thoroughly scrubbed with $NO_x$.

There is an alternate way to rid the capsule of the FeS formed in scrubbing the flue gases. It may be less expensive to produce hydrogen sulfide or use the corresponding iron sulfide as a scrubber for $NO_x$.

During the flocculation period the hot vented gases before going back to the furnace mouth are passes through a Cotrell precipitator to remove any of the metallic oxides that are formed by the aluminum-oxygen reaction.

When the slag in an ordinary coke bed does not flow readily, there is a decrease in burning rate, air flows through channels, the slag chills and there is a complete freeze up. (This is overcome by more uniform temperatures.)

Slag composition under typical conditions is very important to slag viscosity also. Slags consist mainly of metal oxides found in the non-combustible fraction of municipal refuse. These oxides form complex compounds of low viscosity. Silica ($SiO_2$) is the most abudant oxide found in municipal refuse in the non-combustible fraction. Glass, which accounts for upwards of 40% of refuse inerts, is 70 – 75% silica. The viscosity of molten silica is very high. Molten aluminum oxide ($Al_2O_3$), iron oxide ($FeO_2$), titanium oxide ($TiO_2$), and phosphorus pentoxide ($P_2O_5$) tent to make interlocking compounds with the structural network of a silicate slag, with an attendant increase in viscosity.

The present system is unique in that it is a horizontal furnace, 99% of the iron that would become iron oxide is removed prior to reaching the furnace mouth magnetically. Refuse aluminum will be almost entirely converted to $Al_2O_3$ in the furnace and become part of the slag. Aluminum is readily oxidized by $CO_2$, $H_2O$ (vap.) and free $O_2$. The oxide of aluminum would not be objectionable to the quality of viscosity because of the small particle size.

As an example: Glycerin has a viscosity of 5 poise at about 86° F. and glass has a viscosity of 100 poise at 2600° F., glass at 1900° F. is 10,000 poise. Pre-heated air entering the furnace mouth that is pre-mixed with the finely shredded refuse (temp. 900° F. – 1,000° F.) is very important in keeping correct viscosity.

| Item | ASH ANALYSES FOR REFUSE | | | |
|------|-------------------------|---|---|---|
|      | Refuse*(%) | | Coal**(%) | |
| Mineral analyses (ignition basis): | | | | |
| Phosphorus pentoxide | 1.02 – | 4.69 | 0.08 – | 0.20 |
| Silica | 48.93 – | 60.07 | 45.52 – | 46.93 |
| Ferric oxide | 3.50 – | 5.92 | 15.51 – | 25.29 |
| Alumina | 5.02 – | 13.72 | 16.54 – | 18.53 |
| Titania | 0.74 – | 1.60 | 0.81 – | 1.01 |
| Lime | 7.54 – | 18.19 | 2.13 – | 6.31 |
| Magnesia | 1.14 – | 1.91 | 0.80 – | 0.92 |

-continued

ASH ANALYSES FOR REFUSE

| Item | Refuse*(%) | | Coal**(%) | |
|---|---|---|---|---|
| Sulfur trioxide | 1.84 – | 12.54 | 1.41 – | 6.28 |
| Potassium oxide | 1.57 – | 2.70 | 1.70 – | 1.78 |
| Sodium oxide | 3.62 – | 5.95 | 0.30 – | 0.62 |
| Undetermined | 0.08 – | 0.69 | 0.39 – | 5.25 |

*Taken from three samples of St. Louis refuse, with magnetic metals removed.
**Taken from three samples of Union Electric Company coals.

PROXIMATE AND ULTIMATE ANALYSES FOR REFUSE RANGES OF COMPOSITION

| Item | Refuse* | |
|---|---|---|
| Proximate analyses: | | |
| Moisture | 19.69 – | 31.33 |
| Ash | 9.43 – | 26.83 |
| Volatile | 36.76 – | 56.24 |
| Fixed carbon | 0.61 – | 14.64 |
| Btu per pound | 4,171 – | 5,501 |
| Ultimate Analyses: | | |
| Moisture | 19.69 – | 31.33 |
| Carbon | 23.45 – | 33.47 |
| Hydrogen | 3.38 – | 4.72 |
| Nitrogen | 0.19 – | 0.37 |
| Chlorine | 0.13 – | 0.32 |
| Sulfur | 0.19 – | 0.33 |
| Ash | 9.43 – | 26.83 |
| Oxygen | 15.37 – | 31.90 |

*Taken from three samples of the St. Louis refuse, withmagnetic metals removed.

One way of providing the reduced pressure in the upper portion of flocculation chamber 16 is to provide a tank 88 which receives steam at an inlet tube 90 from one of the heat exchangers of furnace 12. Seawater at a relatively cool temperature can be directed into tank 88 to cool the steam therein and, when it is cooled, the partial vacuum is created in tank 88. When the vacuum is desired in chamber 16, valves 92 and 94 are opened, thereby placing chamber 16 in fluid communication with tank 88 by way of a tube 96. This causes a sudden expansion of the flocculated silicon dioxide in chamber 16. The excess water in tank 88 can be allowed to gravitate through an outlet tube 98 having a valve 100 above a disposal tank 102.

Figure 4:
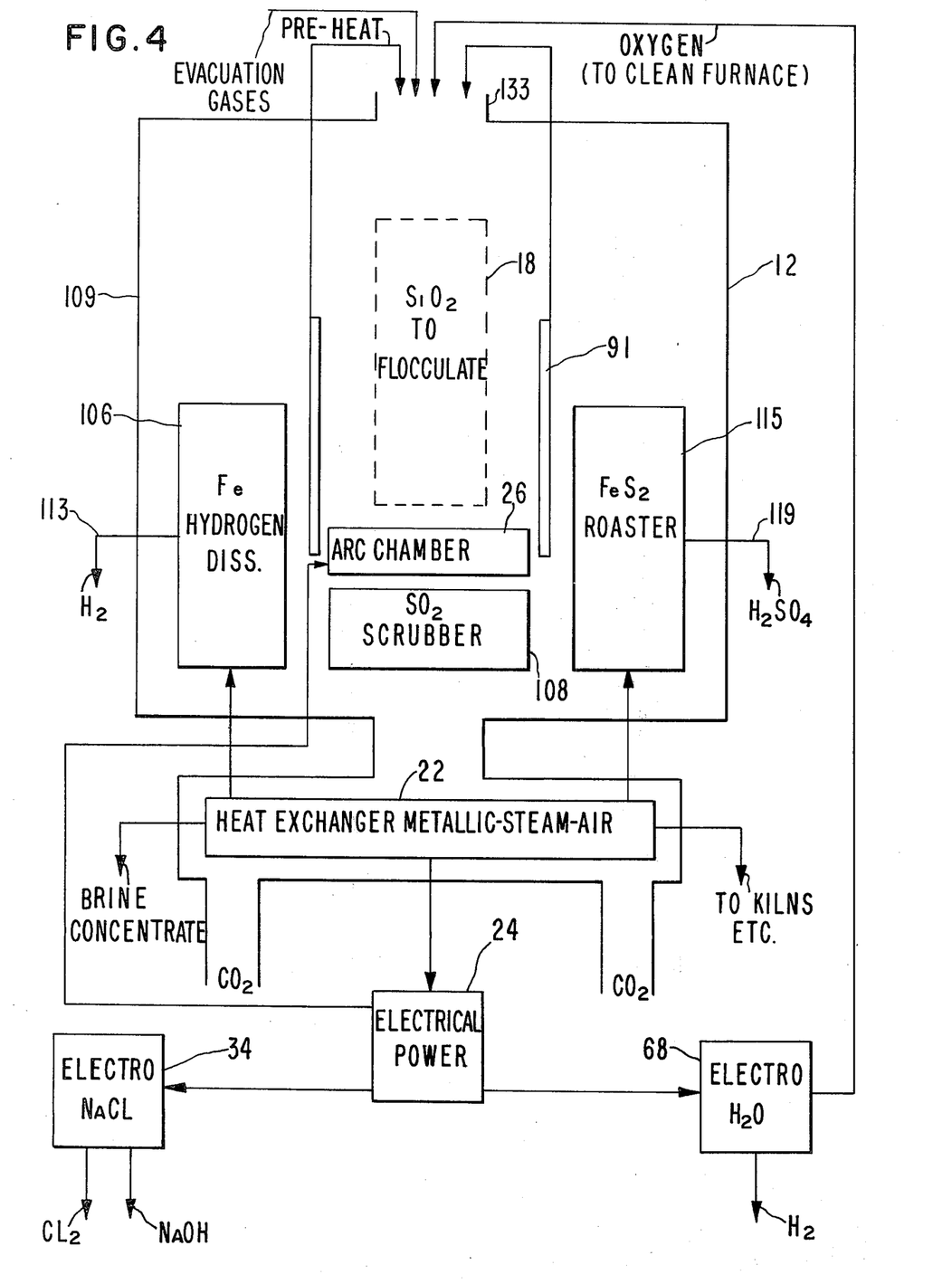
FIG. 4 is a schematic view of the furnace of the system showing the various function performed as a result of the combustion of trash therein.

The silicon dioxide collected in furnace 12 is shown schematically by block 18 of FIG. 4. Actually, it gravitates to bottom 14 of furnace 12 and passes therefrom to chamber 16.

Chamber 16 is shown in schematic form in FIG. 6 along with assemblies 86, the latter preferably being operated by steam pressure generated in one of the heat exchangers coupled with furnace 12. Cooling water jackets may surround chamber 16 to cool the inner surface thereof and seawater can be used for this cooling process. The flocculated block of silicon dioxide is denoted by block 104 (FIG. 6). The water in tank 102 (FIG. 3) is shown schematically as being directed along with the seawater from the cooling jackets back to a heat exchanger.

Furnace 12 is shown schematically in FIG. 4 and illustrates the arc chamber 26 in the path of the effluent therefrom. Also, heat exchanger means denoted by block 22 of FIG. 1 is also shown in FIG. 4 in the path of the effluent. However, the heat exchanger can be in heat exchange relationship to the wall of the furnace. FIG. 4 illustrates that the heat exchanger can use metal, steam or air as the fluid therein. Also, there may be more than one heat exchanger, all having a different fluid therein. The heat exchanger is shown as being coupled to generators 24 which are coupled with electrolysis tanks 34 and 68 for electrolyzing seawater and the distilled water, respectively. However, electricity is supplied to the entire system from the generators 24. Power may be cut off in various parts of the system when the need arises (negation of electrolysis, etc.).

Figure 5:
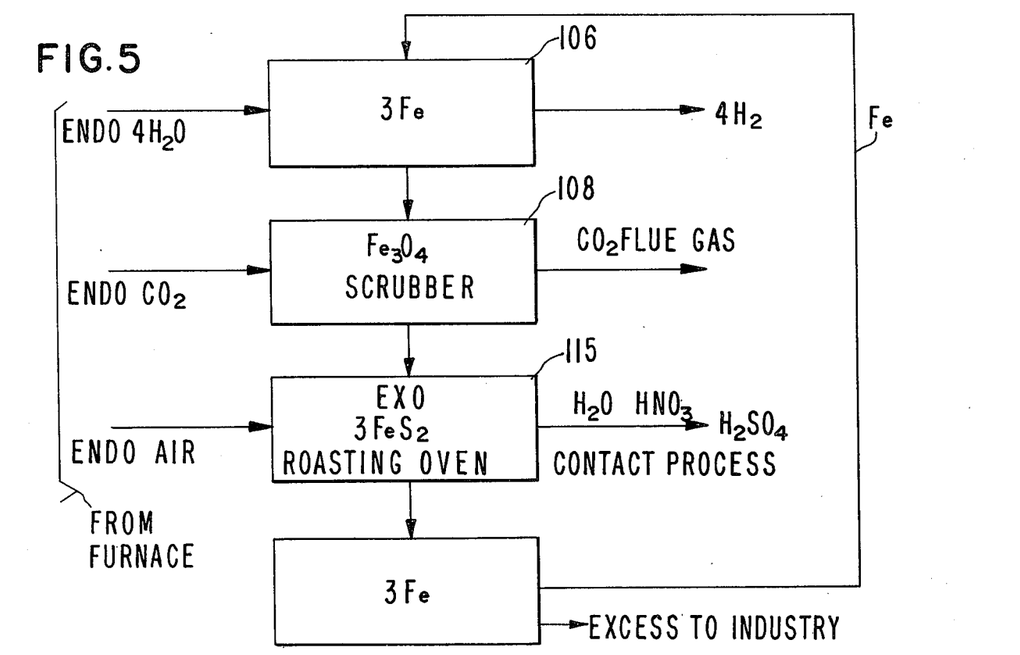
FIG. 5 is a block diagram of several processes involving molten iron extracted from the furnace as a result of the combustion of trash therein along with magnetically preseparated iron that has been reduced in size for added surface area for production of hydrogen.

The high-temperature gases within furnace 12 can be utilized for production of hydrogen by oxygen exchange between iron at about 1250° F and steam at about 900° F. This is illustrated schematically in FIGS. 5 and 7 wherein iron particles within a capsule 106 in a closed condition to chamber 109 in a first position above furnace 12 are subjected to endothermic water in the form of steam from an exchanger 107 (FIG. 7) into which distilled water is directed from, for instance, storage tank 62 (FIG. 1). The effluent is required to be hot, such as a temperature of about 1250° F, since iron and water do not react satisfactorily below that temperature for an oxygen-hydrogen exchange. The stem combines with the heated iron particles to produce hydrogen by hydrogen-oxygen exchange leaving a form of iron oxide $Fe_3O_4$. The system for producing hydrogen within furnace 12 is of advantage because no carbon dioxide enters capsule 106 to mix with the iron particles, hence, there is no necessity for scrubbing for carbon dioxide as in older methods of producing hydrogen.

After iron oxide is formed in capsule 106, the capsule is placed in a second position 108 so that endothermic carbon dioxide in the furnace effluent is directed through the iron oxide and is scrubbed thereby so as to eliminate $SO_2$ in the effluent. The effluent passes through the iron sulfide first beyond outlet 121 to remove oxides of nitrogen. The oxides formed by the dissociated chamber 26 should not exceed 12%. The effluent will have previously passed through arc chamber 26. The furnace has a chamber 109 projecting upwardly therefrom, the chamber (FIG. 7) is provided with means (not shown) for removably holding the capsule in three different positions in chamber 109. When capsule 106 is in position 108, the effluent can pass through laterally out of the same since the capsule holder in the second position is perforate. The temperature must be about 550° F. as shown on the lower curve in FIG. 11. Position 108 is across the effluent path immediately downstream of arc chamber 26. The $SO_2$ removed by the scrubbing action of the iron oxide in capsule 106 forms iron sulfide with the iron oxides. There will always be a capsule of iron oxide placed in position 108 and it is well-known to produce iron sulfide by placing a capsule of iron oxide in an effluent containing $SO_2$. The effluent passes through iron sulfide first displacing the sulfur with the $NO_x$ and is captured by the iron oxide downstream of it.

Figure 10:
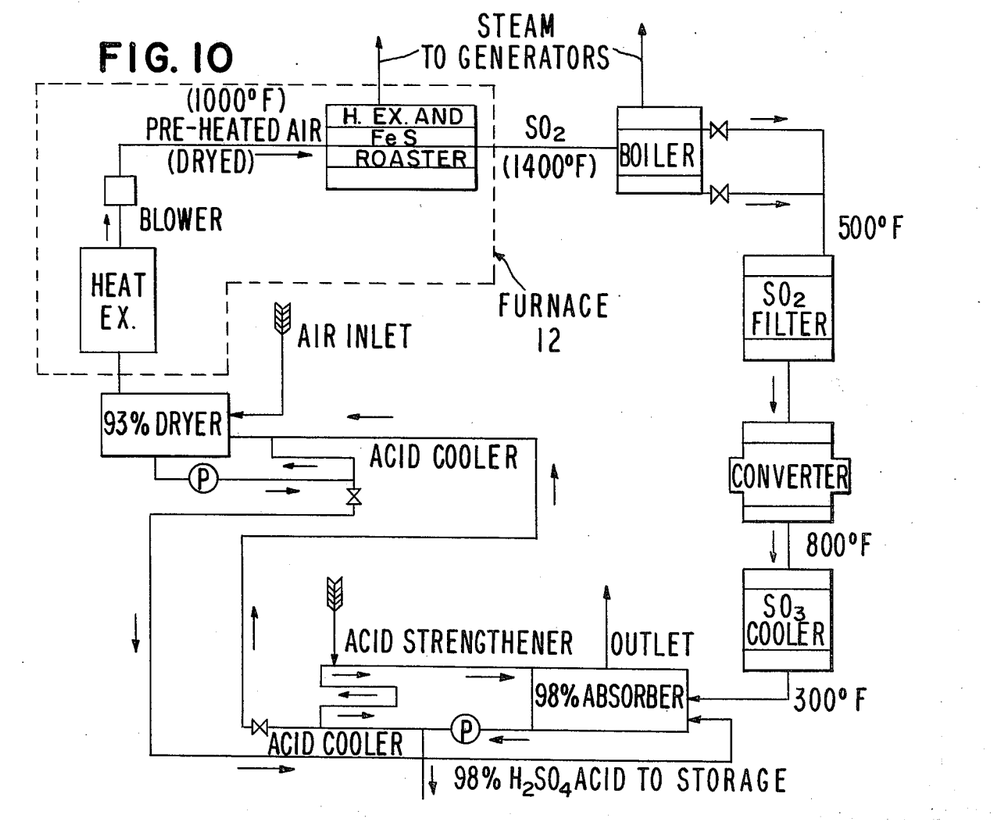
FIG. 10 is a flow diagram showing a contact process for removing $SO_2$ from the scrubber materials.

The effluent does not circulate through the iron particles to produce hydrogen, only stream at 900° F. and iron at 1250° F. are contacted. The effluent contans $SO_2$ before reaching the scrubber but $SO_2$ is scrubbed out by the iron oxide in the scrubber at a temperature of about 550° F. Use of the well-known contact process produces sulfuric acid by directing water into contact with sulfur dioxide. Oxidation to sulfur trioxide is essential to prevent formation of sulfurous acid as shown in FIG. 10. Heat is supplied to start the contact process and the temperature is about 500° F.

The gases, oxygen, nitrogen and hydrogen are liquified in the standard manner, a process of lowering the temperature and raising the pressure until liquification is attained.

The amount of $Fe_3O_4$ can be judged by the ratio of FeS needed and the hourly amount of $NO_x$ produced in the arc chamber. The effluent passes through the perforate holder of position 108 and into the heat exchange relationship to the outer surface of a pair of capsules 106 in the first position and in the third position 115, thereby providing the heat necessary to form hydrogen which is driven off through an outlet 113 and $SO_2$ at outlet 119 in chamber 109. Valved outlet 111 at position 108 is closed when scrubbing at position 108 but is open to allow hydrogen to escape when the capsule is in the first position or a third position 115. Metallic heat exchanger 27 (FIG. 7) operates to absorb some of the heat energy of the effluent to keep the effluent temperature in the range of the scrubbing material.

Figure 7:
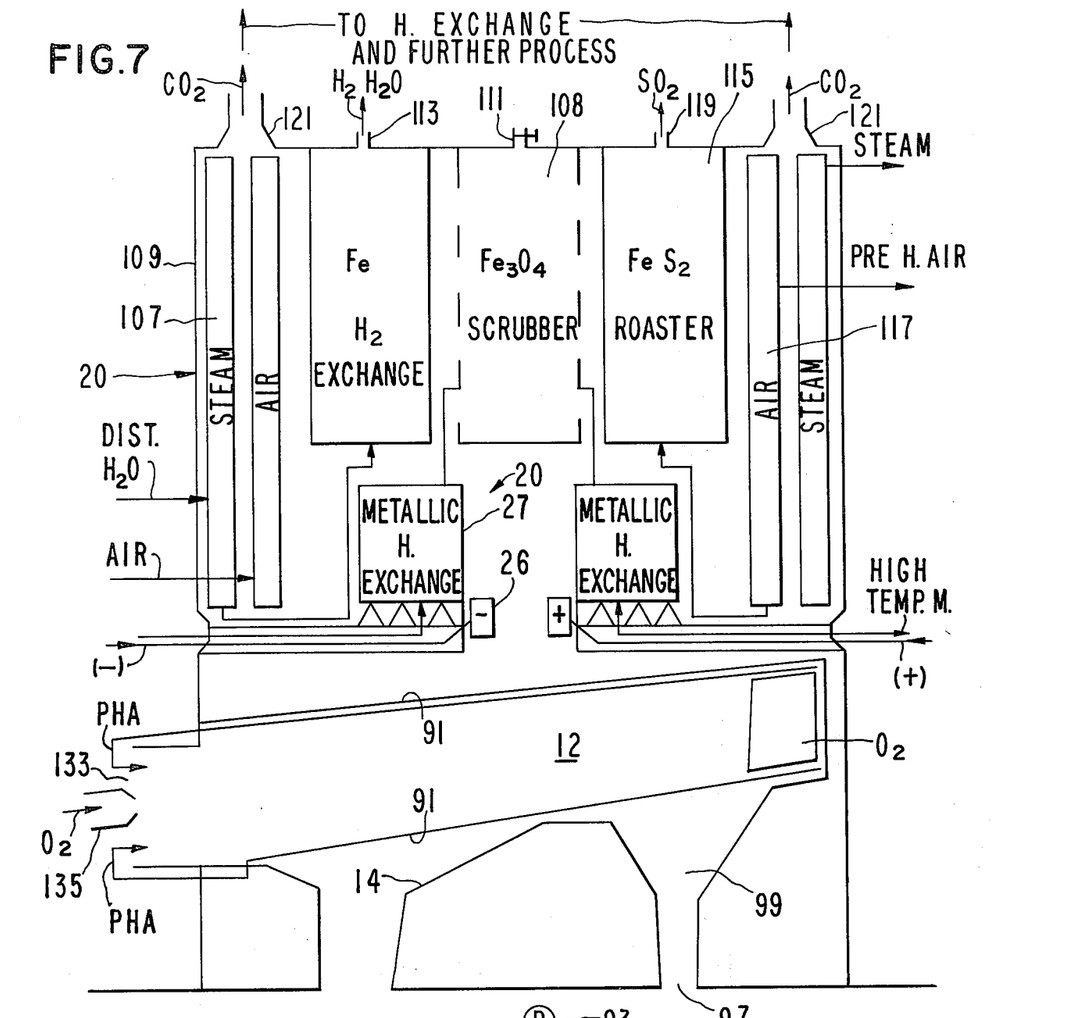
FIG. 7 is a schematic view of the furnace in greater detail, showing the capsules of ferrous material for producing hydrogen and for scrubbing the effluent to eliminate $SO_2$ and $NO_x$.

When capsule 106 is removed from position 108, it is placed in third position 115 in which the holder is closed to the effluent and endothermic air from an air preheater 117 is directed into capsule 106 to start an exothermic reaction to roast the iron sulfide and iron compounded with oxides of nitrogen therein to form $NO_x$ and $SO_2$, the latter being taken off at outlet 119 of chamber 109 and which, upon contact with $H_2O$ and $HNO_3$, produces sulfuric acid (the Contact Process). Waste heat boilers should be used to utilize the excess energy released.

Figure 11:
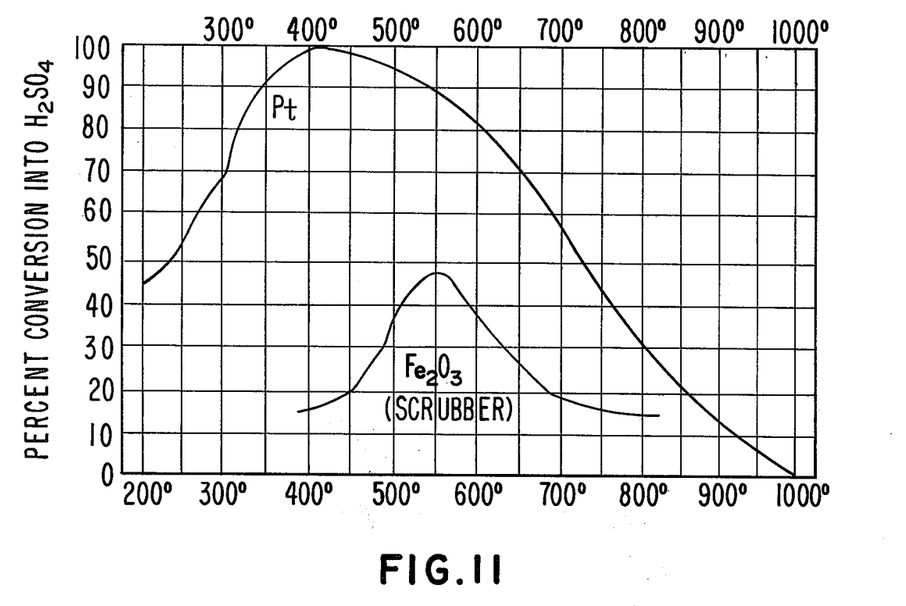
FIG. 11 is a graphic view showing the correlation between a conversion metal and the scrubber material usable with the contact process of FIG. 10.

The graph of FIG. 11 shows the important correlation between $Fe_2O_4$ used as a scrubbing agent and Pt or Pt mixtures used later in the Contact Process. Wherever a particular temperature must be maintained, the excess heat energy will be used for other uses, such as brine concentration, preheating, and steam for power source. Compounds or mixtures containing vanadium pentoxide promoted by iron, potassium, etc. can be used in the contact sulfuric acid process. The advantages are low cost of the catalyst and freedom from poisoning. The conversion efficiency is higher than with platinum when the catalyst functions at about 500°.

The scrubbed effluent circulates throughout chamber 109 to serve as a heating means. The effluent exits from chamber 109 at outlets 121 for further use. Steam preheater 107 and air preheater for the kilns, etc., 117 are in chamber 109 near outlets 121 and are heated by the effluent.

More than one capsule can be used and the capsules can be withdrawn from their holders and placed in position for different reactions but must correspond chemically depending upon their locations within the furnace. The capsules can be used over and over again to carry out the foregoing processes. The cleaning of the ferrous material and the recovery of commercially valuable tin is done in a special system using very hot preheated air from the furnace heat exchanger without the need for external power or heat sources.

The tin and ferrous material in tin cans can be treated in a roasting chamber of kiln (not shown) exteriorly of the furnace so that the ferrous material in the cans can be cleaned and the tin therefrom can be vaporized and recovered when the effluent from the kiln passes through an electrostatic precipitator. Electrical power generated by the operation of the furnace operates the kiln receiving the tin cans and also operates the precipitator. Preheated air from the furnace is the heat source for the kiln and is maintained at a temperature above the vaporization point of tin but below the melting point of the ferrous material. The vaporized stannous material recovered by the precipitator can be collected in any suitable manner and stored for subsequent use or sale. The ferrous material cleaned in the kiln is usable in the capsules described above or can be made available for sale to industry. All unburnt gases and hydrocarbons in the effluent from the kiln are directed, after passing through the precipitator, to the mouth of the furnace for re-entry thereinto and breakdown therein.

The cleaning of the ferrous material and recovery of tin by the foregoing process is not dependent to an outside source of energy since the preheated air and the electrical power is supplied by the operation of the furnace. This feature renders such process valuable, especially in view of the dwindling supply source and current cost of tin.

It is noted also that portable power units can be utilized to provide auxiliary electrical power from conventional internal combustion engines that have been modified to use hydrogen produced in the foregoing manner. Thus, such engines will not pollute the atmosphere and will keep the cost of electrical power generated to a minimum. Moreover, such power sources further add to the fact that system 10 is a self-contained unit.

Figure 2:
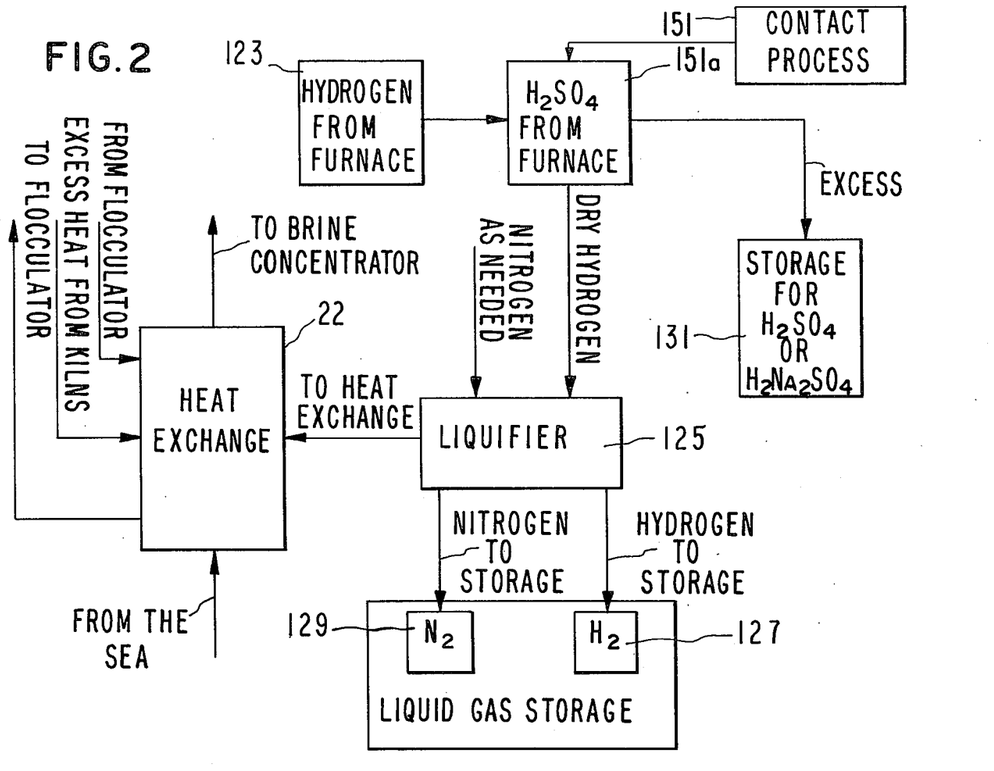
FIG. 2 is a block diagram of a portion of the system for isolating particular constituents.

Hydrogen from outlet 113 (FIG. 7) is directed from a tank 132 into tank 121a where it is dried. The hydrogen is then directed into a liquifier 125 (FIG. 2) and then to a storage tank 127 (FIG. 12) for subsequent use. Similarly, nitrogen from the air can be directed into another liquifier 125 and stored in a tank 129 as liquid nitrogen. Excess sulfuric acid is stored in a tank 131 coupled with tank 121. Nitrogen is also dried with the sulfuric acid separate from the hydrogen. A flow diagram of the process is shown in FIG. 10.

Figure 8:
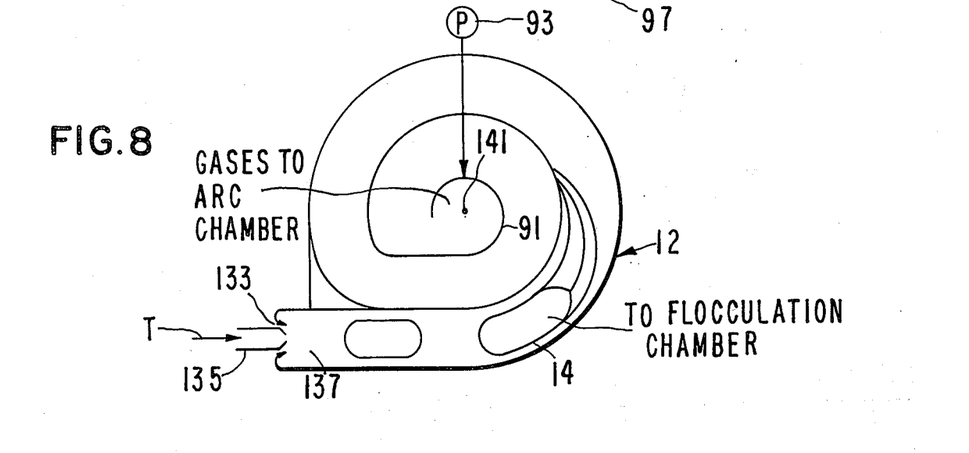
FIG. 8 is a sectional view of the furnace.

Furnace 12 can be in the form shown in FIG. 8, wherein the entrance or mouth 133 of the furnace surrounds a nozzle 135 adjacent to and upstream of a combustion region 137 where the pulverized trash is quickly incinerated. Preheated air is directed into the nozzle. FIG. 8 is a view looking down into the furnace and showing the flocculation chamber entrance defined by sloping floor 14 (FIGS. 6 and 8). The furnace has spirally-shaped walls in which air preheating coils 91 are embedded, such coils being omitted in FIG. 8 but shown schematically in FIG. 4. A pump 93 (FIG. 8) pumps air into coils 91 and the air is heated in the coils and exits therefrom into nozzle 135 to act as a preigniter. The amount and pressure of air in the heater coils controls the air temperature at nozzle 135 and the preignition position. The coils extend along the entire spiral walls. In such positions, the coils are exposed on both sides to the heat generated in the furnace. By regulating the flow of air into such coils and the amount of refuse injected, the temperature of the furnace can be regulated.

FIG. 7 illustrates that furnace floor 14 is angled upwardly to facilitate the removal of molten material by gravity into the flocculation chamber. A valved outlet 97 in the furnace floor is below a region 99 for collection of molten material, such as metals and silaceous materials. The flocculation chamber has a valved outlet 101 at its lower end to permit removal of molten materials, before flocculation. The furnace has an innermost chamber 141 (FIG. 8) from which the gases of combustion rise to the arc chamber 26. the gases of combustion follow the spiral path defined by the spiral walls of the furnace to chamber 141. FIG. 1 shows receptacles 143 and 145 coupled with container 31. These represent means by which the molten materials from furnace 12 can be collected and separated from each other. Such materials can be removed and used after cooling from outlet 101 (FIGS. 3 and 6).

In view of the foregoing, system 10 will be recognized as a self-contained trash disposal process which not only eliminates trash but also combines seawater with the heat generated by the burning of the trash to form concentrated brine which, upon being electrolyzed, results in sodium hydroxide and chlorine. A portion of the sodium hydroxide is subjected to the effluent to form carbonates. Thus, system 10 provides a means of retrieving elements not only from the trash itself but also for seawater which, itself, contains a number of constituents which are required for industrial uses. Since seawater is a limitless source of such elements, system 10 provides an economical way to realize the extraction of such elements from seawater while cooperating in a manner to eliminate trash and garbage without polluting the atmosphere as well as forming valuable compounds from the effluent which would be ordinarily lost.

System 10 provides an energy conversion method in which the combustible material could be trash as described above or could be coal, fuel oil, natural gas, wood or a combination of anyone of these materials, including trash.

For the waste plastics analysis of the invention, only a small number of chemical elements are involved in the possible products as follows; carbon, hydrogen, oxygen, nitrogen and chlorine, as shown on the following table:

| Products(g) | Polyvinyl Chloride | Poly-ethylene | Poly-styrene | Mixture* |
|---|---|---|---|---|
| $CO_2$ | 1.41 | 3.06 | 3.19 | 2.69 |
| CO | traces | 0.06 | 0.08 | 0.01 |
| $H_2O$ | 0.30 | 1.27 | 0.66 | 0.77 |
| $N_2$ | 12.00 | 13.19 | 11.74 | 12.84 |
| NO | traces | 0.06 | 0.06 | 0.05 |
| $O_2$ | 2.12 | 0.34 | 0.34 | 0.01 |
| HCl | 0.55 | — | — | 0.18 |
| $Cl_2$ | 0.04 | — | — | traces |
| Others | traces | 0.02 | 0.02 | 0.01 |
| Temp. | 1,200 K | 2,130 K | 2,200 K | 1,870 K |
| Wt. air input | 15.40 | 16.99 | 15.10 | 16.55 |

All data based on 1 g of plastic.
*Equal parts by weight of the three.

The primary products are the expected combustion products; however, certain potential pollutants are indicated in all of the plastics. In the fuel rich combustion range (which the system being described is not), the equilibrium analyses show significant quantities of hydrogen cyanide gas, HCN, present in all plastics systems. Temperatures higher than those examined show a further preference for this product. This would indicate that the reactor (combustor) design used for the burning of plastic materials must include specific provision for the adequate mixing of the reactants eliminating hot spots in the fuel rich zones. This system has no problems because of the manner in which plastic materials are admitted to the furnace.

A second potential polutant whose quantity is dependent only upon the original quantity of the plastics is hydrogen chloride gas, HCL, produced from polyvinyl chloride. Its presence indicates that combustion equipment must have provision for the recovery of this gas, which is certainly comparable with the oxides of sulfur in potential corrosive effects on biological, metallic, and other systems exposed to it. In this system, the arc chamber dissociates HCN. It recombines afterwards to $CO_2$, $H_2O$ and $N_2$ with a minor amount of $NO_x$.

Recent work done by EPA indicates that the overall plastics content of municipal is only 3% and sulfur content is 0.23% per million BTU.

DECOMPOSITION OF PLASTICS WITHIN FURNACE

As can be noted in the diagram, the plastics have a harmless breakdown except for hydrogen cyanide which is later disassociated to $H_2O + C$ $O_2$ and $N_2$ in the oxygen rich atmosphere of furnace reactor combustor. Chlorine will become an impurity of the soda ash in the reaction of C $O_2$ and NaOH. Oxides of nitrogen also become impurities in the soda ash formed.

That which is claimed is:

1. A trash disposal method comprising: burning a mass of pulverized trash free of large bulky items and containing carbonaceous material, metals and glass in a first region and allowing a gaseous effluent resulting from the burning of said trash to exit from said first region and to flow through a second region; directing a fluid in heat exchange relationship with said first region for heating the fluid to thereby increase the energy content thereof; generating electrical power as a function of the energy content of the fluid; applying a portion of said electrical power across said second region to generate an electrical arc and to subject the effluent thereto, whereby any carbonaceous particle matter in the effluent will be vaporized and converted to carbon dioxide; electrolyzing a mass of seawater to form a mass of chlorine and a mass of sodium hydroxide; storing the chlorine and sodium hydroxide masses in third and fourth regions, respectively; directing a portion of the carbon dioxide from the effluent to said fourth region to form at least one of a mass of sodium carbonate and a mass of sodium bicarbonate; and storing said masses of sodium carbonate and sodium bicarbonate in a fifth region.

2. A trash disposal method comprising: burning a pulverized mass of trash free of large bulky items and containing carbonaceous matter, metals and glass in a first region and allowing a gaseous effluent resulting from the burning of said trash to exit from said first region and to flow through a second region; directing a fluid in heat exchange relationship with said first region for heating the fluid to thereby increase the energy content thereof; generating electrical power as a function of the energy content of the fluid; applying a portion of said electrical power across said second region to generate an electrical arc and to subject the gaseous effluent thereto, whereby any carbonaceous particle matter in the gaseous effluent will be vaporized and converted to carbon dioxide; electrolyzing a mass of seawater to form a mass of chlorine and a mass of sodium hydroxide; storing the chlorine and sodium hydroxide masses in third and fourth regions, respectively; directing a portion of the carbon dioxide from the effluent to said fourth region to form at least one of a mass of sodium carbonate and a mass of sodium bicarbonate; storing said masses of sodium carbonate and sodium bicarbonate in a fifth region; providing a flocculation chamber in fluid communication with said first region for receiving by gravity flow a mass of molten metal and a mass of sillicon dioxide formed when trash is burned; removing said mass of molten metal from said chamber as said silicon dioxide mass remains therein; directing a portion of the carbon dioxide mass of said effluent into said silicon dioxide in said flocculation chamber to flocculate the silicon dioxide mass therein; and reducing the fluid pressure in the chamber to allow the silicon dioxide mass therein to expand after being flocculated by said carbon dioxide mass.

3. A trash disposal method comprising: burning a pulverized mass of trash free of large bulky items and containing carbonaceous material, metals and glass in a first region and allowing a gaseous effluent containing sulfur resulting from the burning of said trash to exit from said first region and to flow through a second region; directing a fluid in heat exchange relationship with said first region for heating the fluid to thereby increase the energy content thereof; generating electrical power as a function of the energy content of the fluid; applying a portion of said electrical power across said second region to generate an electrical arc and to subject the effluent thereto, whereby any carbonaceous particle matter in the effluent will be vaporized and converted to carbon dioxide; electrolyzing a mass of seawater to form a mass of chlorine and a mass of sodium hydroxide; storing the chlorine and sodium hydroxide masses in third and fourth regions, respectively; directing a portion of the carbon dioxide from the effluent to said fourth region to form at least one of a mass of sodium carbonate and a mass of sodium bicarbonate, storing said masses of sodium carbonate and sodium bicarbonate in a fifth region; inserting a capsule of iron particles into a first operative position adjacent to the flow of said effluent, directing a flow of steam through the capsule as the interior thereof is isolated with respect to said effluent to produce a mass of hydrogen; placing the capsule in a second operative position directly in the path of the effluent to form iron sulfide; placing said capsule into a third operative position adjacent to the path of flow of the effluent; directing a flow of heated air through the capsule in said third position while the interior of the capsule is isolated from the effluent to form sulfur dioxide; directing water into contact with the sulfur dioxide to form sulfuric acid by the contact process, the heat required for said contact process coming directly from the heat of combustion of the trash; scrubbing the water vapor from the hydrogen by contacting it with said sulfuric acid; and liquifying the hydrogen after it has been scrubbed.

4. A trash disposal method comprising: burning a pulverized mass of trash free of large bulky items and containing carbonaceous material, metals and glass in a first region and allowing a gaseous effluent resulting from the burning of said trash to exit from said first region and to flow through a second region; directing a fluid in heat exchange relationship with said first region for heating the fluid to thereby increase the energy content thereof; generating electrical power as a function of the energy content of the fluid; applyng a portion of said electrical power across said second region to generate an electrical arc and to subject the effluent thereto, whereby any carbonaceous particle matter in the effluent will be vaporized and converted to carbon dioxide; electrolyzing a mass of seawater to form a mass of chlorine and a mass of sodium hydroxide; storing the chlorine and sodium hydroxide masses in third and fourth regions, respectively; directing a portion of the carbon dioxide from the effluent to said fourth region to form at least one of a mass of sodium carbonate and a mass of sodium bicarbonate; storing said masses of sodium carbonate and sodium bicarbonate in a fifth region; electrolyzing a mass of water by utilizing a portion of said generated electrical power to separate respective masses of hydrogen and oxygen from each other; and receiving and storing the hydrogen and oxygen masses separately from each other.

5. A trash disposal method comprising: burning a pulverized mass of trash free of large bulky items and containing carbonaceous material, metals and glass in a first region and allowing a gaseous effluent resulting from the burning of said trash to exit from a first region and to flow through a second region; directing a fluid in heat exchange relationship with said first region for heating the fluid to thereby increase the energy content thereof; generating electrical power as a function of the energy content of the fluid; applying a portion of said electrical power across said second region to generate an electrical arc and to subject the effluent thereto, whereby any carbonaceous particle matter in the effluent will be vaporized and converted to carbon dioxide; electrolyzing a mass of seawater to form a mass of chlorine and a mass of sodium hydroxide; storing the chlorine and sodiumhydroxide masses in third and fourth regions, respectively; directing a portion of the carbon dioxide from the effluent to said fourth region to form at least one of a mass of sodium carbonate and a mass of sodium bicarbonate; storing said masses of sodium carbonate and sodium bicarbonate in a fifth region; collecting a mass of a pair of molten metals of different types melted in said first region; and separating said molten metals from each other.

6. An energy conversion method comprising: burning a mass of a combustible carbonaceous material in a first region and allowing a gaseous effluent resulting from the burning of said material to exit from said first region and to flow through a second region; directing a fluid in heat exchange relationship with said first region for heating the fluid to thereby increase the energy content thereof; generating electrical power as a function of the energy content of the fluid; applying a portion of said electrical power across said second region to generate an electrical arc and to subject the effluent thereto, whereby any carbonaceous particle matter in the effluent will be vaporized and converted to carbon dioxide; electrolyzing a mass of seawater to form a mass of chlorine and a mass of sodium hydroxide; storing the chlorine and sodium hydroxide masses in third and fourth regions, respectively; directing a portion of the carbon dioxide from the effluent to said fourth region to form at least one of a mass of sodium carbonate and a mass of sodium bicarbonate; and storing said masses of sodium carbonate and sodium bicarbonate in a fifth region.

7. A method as set forth in claim 6, wherein said combustible material is trash.

8. A method as set forth in claim 6, wherein said combustible material is coal.

9. A method as set forth in claim 6, wherein said combustible materials is oil.

10. A method as set forth in claim 6, wherein said combustible material is natural gas.

11. A method as set forth in claim 6, wherein said combustible material is wood.

* * * * *